United States Patent
Wang et al.

(10) Patent No.: US 8,155,524 B2
(45) Date of Patent: *Apr. 10, 2012

(54) METHOD AND APPARATUS FOR TRANSMITTING MULTIPLE CHANNELS IN A WAVELENGTH DIVISION MULTIPLEXED (WDM) OPTICAL COMMUNICATION SYSTEM WITH REDUCED RAMAN CROSSTALK AND NONLINEAR DISTORTIONS

(75) Inventors: Jun J. Wang, Horsham, PA (US); Kerry Litvin, Huntingdon Valley, PA (US)

(73) Assignee: General Instrument Corporation, Horsham, PA (US)

( * ) Notice: Subject to any disclaimer, the term of this patent is extended or adjusted under 35 U.S.C. 154(b) by 831 days.

This patent is subject to a terminal disclaimer.

(21) Appl. No.: 12/138,977

(22) Filed: Jun. 13, 2008

(65) Prior Publication Data
US 2009/0310967 A1    Dec. 17, 2009

(51) Int. Cl.
*H04J 14/02*      (2006.01)
(52) U.S. Cl. .............................. 398/79; 398/68; 398/69
(58) Field of Classification Search .............. 398/34, 398/66, 68, 69, 79, 91, 93, 94, 182, 188, 398/197, 198
See application file for complete search history.

(56) References Cited

U.S. PATENT DOCUMENTS

| | | | |
|---|---|---|---|
| 6,912,073 B2 | 6/2005 | Wildeman et al. | |
| 7,271,948 B1 * | 9/2007 | Wang et al. | 359/334 |
| 7,920,795 B2 * | 4/2011 | Wang et al. | 398/188 |
| 2002/0197036 A1 * | 12/2002 | Kim et al. | 385/123 |
| 2004/0136646 A1 | 7/2004 | Sharar et al. | |
| 2004/0141748 A1 * | 7/2004 | Spickermann et al. | 398/72 |

OTHER PUBLICATIONS

PCT Search Report & Written Opinion, RE: Application #PCT/US2009/046561 Jul. 29, 2009.

* cited by examiner

*Primary Examiner* — Dzung Tran
(74) *Attorney, Agent, or Firm* — Richard A. Wulff

(57) ABSTRACT

An improved method and apparatus is provided for transmitting a WDM optical signal. The method begins by modulating optical channels that are each located at a different wavelength from one another with (1) a respective one of a plurality of information-bearing electrical signals that all embody the same broadcast information; (2) a respective one of a plurality of RF signals having a common functional broadcast waveform, at least one of the RF signals being out of phase with respect to remaining ones of the plurality of RF signal and (3) at least one of the RF signals being phase adjusted with respect to its original phase. Each of the modulated optical channels is multiplexed to form a WDM optical signal. The WDM optical signal, while maintaining the pre-assigned phase relationships between the modulation signals of the optical channels, is forwarded onto an optical transmission path.

35 Claims, 5 Drawing Sheets

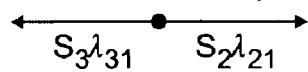 $S_1 @ \lambda_1$ : phase = 0°

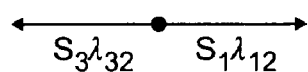 $S_2 @ \lambda_2$ : phase = 180°   Fig. 6A

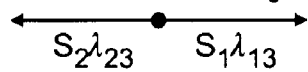 $S_3 @ \lambda_3$ : phase = 0°

Row 1: Net Raman Impairment on $S_1 = |S_3\lambda_{31} + S_2\lambda_{21}|e^{i180°}$ $\overleftrightarrow{S_3\lambda_{31} \quad S_2\lambda_{21}}$

Fig. 6B   Row 2: Net Raman Impairment on $S_2 = 0$ $\overleftrightarrow{S_3\lambda_{32} \quad S_1\lambda_{12}}$ Row 3: Net Raman Impairment on $S_3 = |S_1\lambda_{13} + S_2\lambda_{23}|e^{i0°}$ $\overleftrightarrow{S_2\lambda_{23} \quad S_1\lambda_{13}}$ $S_1 @ \lambda_1$ : with added phase $S_2 @ \lambda_2$ : phase = 180°   Fig. 6C

$S_3 @ \lambda_3$ : with added phase

Fig. 6D
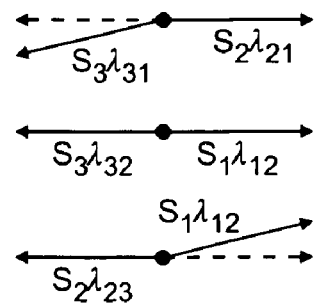

METHOD AND APPARATUS FOR TRANSMITTING MULTIPLE CHANNELS IN A WAVELENGTH DIVISION MULTIPLEXED (WDM) OPTICAL COMMUNICATION SYSTEM WITH REDUCED RAMAN CROSSTALK AND NONLINEAR DISTORTIONS

FIELD OF THE INVENTION

The invention relates generally to the transmission of multiple communication channels using wavelength division multiplexed (WDM) optical signals. More particularly, the invention relates to an improved method and apparatus which utilizes destructive interference to further reduce Raman induced crosstalk and nonlinear signal distortions between the optical channels.

BACKGROUND OF THE INVENTION

MSOs (multi-service operators) provide several services to end users through a fiber optic network, with the final connection to the user through a coaxial connection. The services provided by the MSO typically include broadcast analog video and narrow cast digital services, such as data, VoIP, subscription, pay per view and video on demand (VOD) services. The services are generally allocated a portion of an optical channel, which typically has approximately 1 GHz bandwidth available. While the bandwidth of a channel is generally constrained by the network (including, e.g., the analog optical transmitters and receivers, and the coaxial connection), the number of users connected to the network continues to increase, which together with the new broadband services require increased demand for bandwidth for the desired services.

In recent years wavelength division multiplexed (WDM) optical transmission systems have been increasingly deployed in optical networks to meet the increased demand for bandwidth by providing more than one optical channel over the same optical fiber. The WDM techniques include coarse wavelength division multiplexed (CWDM) and dense wavelength division multiplexed (DWDM) systems. Whether a system is considered to be CWDM or DWDM simply depends upon the optical frequency spacing of the channels utilized in the system.

FIGS. 3 and 4 show simplified block diagrams of conventional WDM transmission arrangements. As illustrated in FIG. 3, data or other information-bearing signals S1, S2, S3 and S4 are respectively applied to the inputs of modulators 2101, 2102, 2103, and 2104. The modulators 2101, 2102, 2103, and 2104, in turn, drive lasers 2121, 2122, 2123, and 2124, respectively. The lasers 2121, 2122, 2123, and 2124 generate data modulated optical channels at wavelengths λ1, λ2, λ3 and λ4, respectively, where λ4>λ3>λ2>λ1. A wavelength division multiplexer (WDM) 214 receives the optical channels and combines them to form a WDM optical signal that is then forwarded onto a single optical transmission path 240.

As illustrated in FIG. 4, digital signals, which may consist of broadcast and narrowcast signals, may be RF frequency multiplexed into the signal band. The digital signals are normally much lower in amplitude than broadcast analog video signals. The arrangement of sending the same broadcast signal and different narrowcast signals over multiple wavelengths (WDM) is a means of providing more segmentation in an optical network. As illustrated in FIG. 4, an RF splitter 216 splits the broadcast signal among the lasers 2121, 2122, 2123, and 2124. As shown, the lasers 212 each receive a different narrowcast signal. The wavelengths carrying the combined broadcast and individual narrow cast signals, λ1, λ2, λ3 and λ4, respectively, are optically multiplexed onto optical fiber 240.

Although WDM optical transmission systems have increased the speed and capacity of optical networks, the performance of such systems is limited by various factors such as chromatic dispersion and the fiber nonlinearity, which can cause, for example, pulse shape change in the case of baseband digital signals and distortions in case of analog signals. These impairments degrade the quality of the optically transmitted information. Fiber nonlinearities, for example, can give rise to crosstalk between optical signals operating at different wavelengths. When crosstalk occurs, modulation components of one signal are superimposed on another signal at a different wavelength. If the level of crosstalk is sufficiently large it will corrupt the information being transmitted by the optical signals impacted by this impairment.

One common cause of crosstalk, in an optical fiber communication system with multiple wavelengths, is Raman scattering. This type of crosstalk is caused by stimulated Raman scattering (SRS) in silica fibers (and other materials) when a pump wave co-propagates with a signal wave through the same fiber. Stimulated Raman scattering is an inelastic scattering process in which an incident pump photon loses its energy to create another photon of reduced energy at a lower frequency. The remaining energy is absorbed by the fiber medium in the form of molecular vibrations (i.e. optical phonons) FIG. (1) is a schematic diagram of the stimulated Raman scattering process. FIG. 1 illustrates a pump photon scattering in the Raman media. As a result of the scattering event the pump photon is annihilated and a new signal photon at the Stokes frequency is created along with an optical phonon at the Stokes shift frequency. Both energy and momentum are conserved:

$$\hbar\omega_{pump} = \hbar\omega_{signal} + \hbar\omega_{Op\,phonon} \text{ and}$$
$$\hbar\vec{k}_{pump} = \hbar\vec{k}_{signal} + \hbar\vec{k}_{Op\,phonon}, \qquad (1)$$

where ωx is the frequency of x and kx is the associated wavevector of x and $\hbar$ is Planck's constant divided by 2π.

FIG. 2 shows how the transfer of energy from Raman gain gives rise to crosstalk. FIG. 2 is a simplified illustration that is useful in facilitating an understanding of Raman crosstalk between two optical channels or signals Si and Sj, where Sj is at a longer wavelength than Si. FIG. 2A shows the signal Si and FIG. 2B shows the signal Sj. For simplicity of illustration Sj is shown as a signal with constant amplitude (i.e. a continuous string of zeros or ones in the case of baseband digital modulation). As indicated in FIG. 2C, the pattern of signal Si (dashed line) is impressed on the signal Sj by the process of Raman amplification. In other words, signal Sj now includes as one of its components the pattern of signal Si. Likewise, since signal Si is pumping the signal Sj, the pattern of signal Sj (had it been modulated) would be impressed upon the pump Si by the process of pump depletion.

In addition to the generation of unwanted crosstalk the SRS process can also lead to the generation of Raman induced second order (CSO: composite second order) and third order (CTB: composite triple beat) distortions. These distortions occur as result of the nonlinear nature of the Raman amplification process which, in the undepleted regime, is exponential in form.

Further, the Raman induced crosstalk and nonlinear distortions are more pronounced when the wavelengths are located near the zero dispersion wavelength of the optical transmission media through which the signals are co-propagating (i.e. the optical fiber). In the case of a near zero dispersion system the optical pump and signal waves are propagating at nearly identical group velocities through the media. The zero dispersion wavelength of a transmission media refers to the wavelength at which an optical signal will have no change in (inverse) group velocity with respect to changes in its optical frequency. The zero dispersion wavelength differs for different transmission media. In this case, the relative positions of the waves with respect to one another will remain nearly fixed throughout the length of the transmission media. Thus, if the signals Si and Sj are at or near the zero dispersion wavelength, they will largely maintain their relative phase with respect to one another. Hence, with very little walk-off occurring between the optical channels the Raman induced crosstalk and distortions can build up along the fiber in a constructive manner. The dispersion will generally increase as the wavelength difference between the optical signal wavelength and the zero dispersion wavelength increases. If the signals Si and Sj are located at wavelengths far displaced from the zero dispersion wavelength, their relative phases will change as they propagate down the transmission path. The levels of Raman induced crosstalk and distortions are much lower in the nonzero dispersion scenario because, as the signals walk away from one another, it becomes more difficult for the crosstalk and distortions to build up constructively along the fiber length.

With reference again to FIGS. 3 and 4, Raman crosstalk may occur among the optical channels $\lambda 1$, $\lambda 2$, $\lambda 3$ and $\lambda 4$. Raman interactions cause both crosstalk and second order distortions (third order distortions are generally smaller than second order distortions) on each optical channel. In general, the analog signal formats are typically more susceptible to impairment corruption than the digital signal formats.

The widely used optical wavelengths in a typical CATV application, e.g. around 1310 nm, exhibit little relative dispersion between adjacent ITU frequencies, and hence are particularly affected by the SRS and some other fiber nonlinearity effects when used in a WDM system. Moreover, a typical CATV application also uses a single laser to transmit both the broadcast signal and the narrowcast signal. As a result, in order to meet the increased demand for additional bandwidth, CATV MSOs may be required to install more optical fiber to carry additional channels, and then segment their subscriber base between the newly installed optical fiber and the existing fiber. However, this approach requires a significant capital investment for the MSOs and often negotiation of additional access rights to install the optical fiber. Alternatively, the CATV MSOs may use WDM technologies. In order to implement WDM technologies the signal degradations caused by the fiber nonlinearities, such as Raman crosstalk, need to be overcome within the traditional wavelength window, around 1310 nm. The MSO's may use other wavelengths which are less affected by SRS and the other fiber nonlinearities, e.g. 1550 nm. However use of these wavelengths require more expensive optical components, e.g. lasers, dispersion compensators and nodes. This also requires significant changes to their existing optical networks, in addition to a significant capital investment.

Accordingly, it is desirable to have a method and apparatus for reducing the levels of Raman induced crosstalk and distortions that arises among the individual channels comprising a WDM optical system. This is particularly true in the case of a system utilizing optical channels that are located near the zero dispersion wavelength of the transmission medium, and also, in the case of wavelength division multiplexed systems, channels that are operated away from the zero dispersion wavelength. The method and apparatus described herein utilizes destructive interference amongst coherently related signals. In this case the coherence comes about as result of identical modulation information being imparted upon the various optical carriers in the system.

SUMMARY OF THE INVENTION

In accordance with the principles of the invention, a method of transmitting a WDM optical signal may comprise the step of: modulating a plurality of optical channels that are each located at a different wavelength from one another with a respective one of a plurality of information-bearing broadcast signals that all embody the same broadcast information, at least one of the broadcast signals being out of phase with respect to remaining ones of the plurality of broadcast signals; applying a phase adjustment to one or more of the broadcast signals or one or more of the optical channels; multiplexing each of the optical channels to form a WDM optical signal; and forwarding the WDM optical signal onto an optical transmission path. The method may further comprise applying a phase shift to at least one of the plurality of broadcast signals relative to the remaining ones of the plurality of broadcast signals so that the one broadcast signal is out of phase with respect to the remaining broadcast signals. The method may further comprise applying another phase shift to selected ones of the plurality of broadcast signals so that the optical channels modulated thereby have contributions to Raman crosstalk at a selected one of the optical channels that are diminished by contributions to Raman crosstalk from optical channels that do not undergo a phase shift. In the method, the step of modulating a plurality of optical channels may further include combining a narrowcast signal with each broadcast signal prior to modulating. In the method the wavelengths may be sequential or non-sequential wavelengths. In the method, the optical channels may be located at wavelengths at or near a zero dispersion wavelength of the transmission path. Alternatively, the optical channels may also be located at wavelengths away from the zero dispersion wavelength.

In accordance with the principles of the invention a WDM optical transmitter may comprise: a plurality of optical sources for generating optical channels located at different wavelengths; a plurality of modulators each having an input for receiving a respective one of a plurality of information-bearing broadcast signals that all embody the same broadcast information, each modulator being associated with a respective one of the plurality of optical sources to thereby provide a plurality of modulated optical channels; at least one phase shifter for establishing an out-of-phase relationship between at least one of the plurality of broadcast signals and remaining ones of the plurality of broadcast signals such that Raman impairments are reduced; a phase adjustor for causing adjustment of a phase of at least one of the plurality of modulated optical channels so that Raman impairments are further reduced; and a multiplexer coupled to the plurality of optical sources to receive and combine the modulated optical channels to produce a multiplexed optical signal, In the apparatus of the invention, the phase shifter may be configured to apply a phase shift of 180 degrees to the at least one of the plurality of broadcast signals relative to the remaining ones of the plurality of broadcast signals. In the apparatus the optical channels may be located at wavelengths at or near a zero dispersion wavelength of an optical transmission path into which the optical signal is to be transmitted or off from the zero dispersion wavelength. The apparatus may further include a phase controlling element, such as a cut length of optical fiber or RF cable, which equalizes the paths of the modulated optical channels so that the modulation signals of at least one of the modulated optical channels is out of phase with respect to those of the remaining modulated optical channels at the output of the multiplexer or on the transmission optical fiber to which the multiplexer is coupled. In the apparatus, the plurality of modulator may include modulators which directly or externally modulate a laser transmitter with the broadcast signals and narrowcast signals on an optical channel.

A method and apparatus is provided for transmitting a WDM optical signal. The method begins by modulating a plurality of optical channels that are each located at a different wavelength from one another. Each of the plurality of optical channels, which may be an even or odd number of channels, is modulated with a respective one of a plurality of information-bearing broadcast signals that all embody the same broadcast information. The plurality of information bearing broadcast signals is prepared in a manner such that their phases alternate between 0 and 180 degrees (i.e. 0 and π radians) with respect to one another at the output of the multiplexer prior to being applied as modulation Furthermore, each of the plurality of optical channels may have imparted upon them an additional information bearing modulation that is unique and specific to each optical channel. The narrowcast modulation on any one of the optical channels is generally uncorrelated with the narrowcast modulation information being transmitted any of the other optical channels in the system. Each of the plurality of modulated optical channels is then multiplexed to form a WDM optical signal.

The optical signal paths starting from the individual outputs of the plurality of optical channel sources (e.g., lasers) to the output of the multiplexer are intentionally constructed in such a manner so as not to impart any additional erroneous relative phase shifts upon the plurality of modulating broadcast signals. The combined WDM optical signal is then forwarded onto an optical transmission path.

BRIEF DESCRIPTION OF THE DRAWINGS

FIGS. 6A-D illustrate the interaction of Raman induced interference by adjusting the phase of the optical signals.

DETAILED DESCRIPTION

Figure 1:
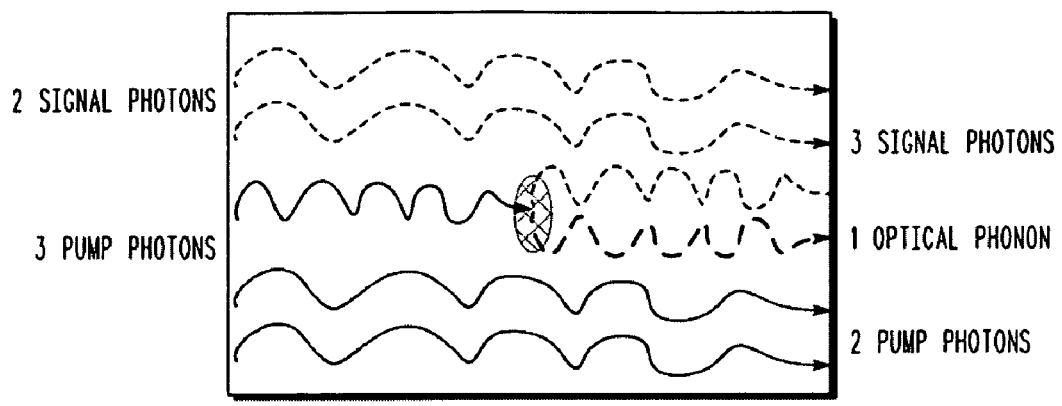
FIG. 1 is a schematic diagram illustrating the stimulated Raman scattering process.
Figures 2A, 2B, 2C:
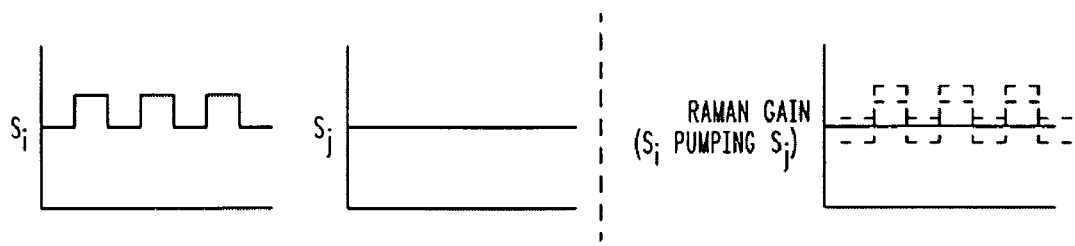
FIGS. 2A and 2B show signals Si and Sj, respectively.
FIG. 2C shows signal Si pumping signal Sj, for the purpose of facilitating an understanding of Raman crosstalk.
Figure 3:
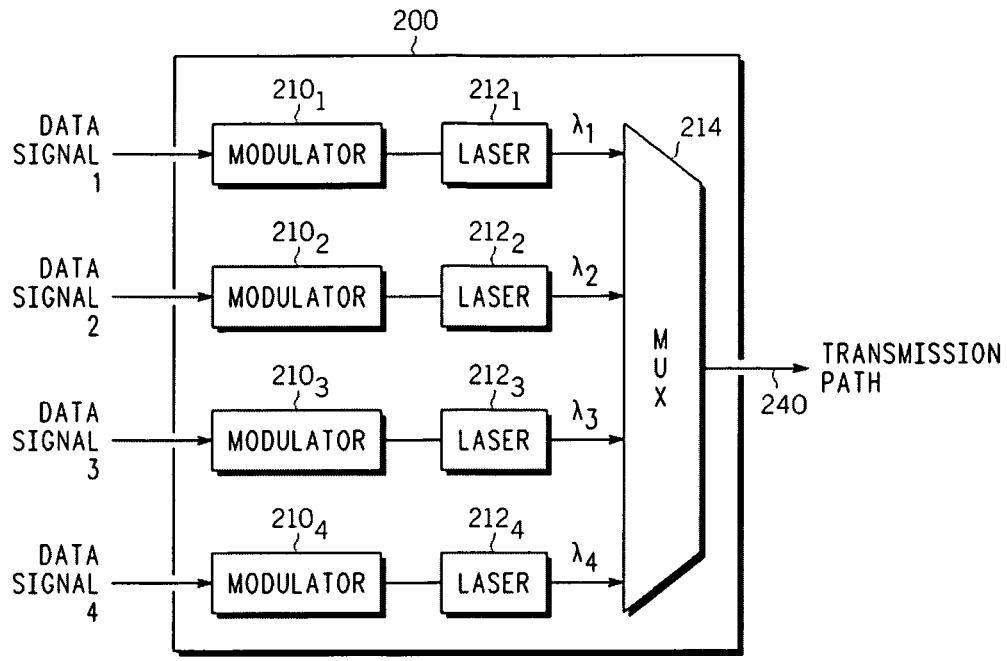
FIG. 3 shows a simplified block diagram of a conventional WDM transmission arrangement.
Figure 4:
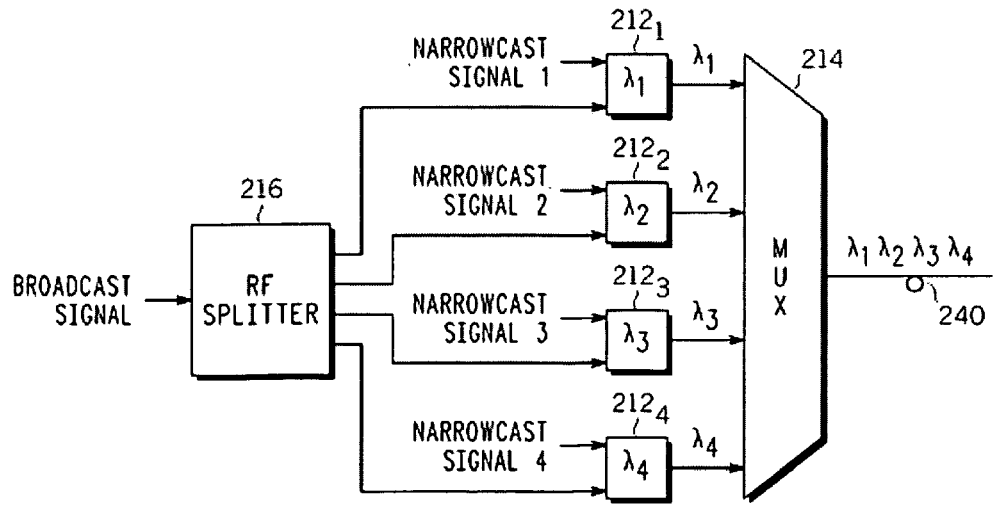
FIG. 4 illustrates a typical WDM transmitter for common broadcast and different narrowcast transmissions in CATV transmission systems.

The present invention describes an arrangement which allows an MSO to increase the capacity of an optical network by enabling use of a WDM system. The method and apparatus described herein utilizes destructive interference among coherently related signals. In this case the coherence comes about as result of identical modulation information being imparted upon the various optical carriers in the system.

A discussion of reducing Raman crosstalk is provided in commonly assigned by the same inventors U.S. Ser. No. 11/612,832 filed on Dec. 19, 2006 titled "Method And Apparatus For Reducing Crosstalk And Nonlinear Distortions Induced By Raman Interactions In A Wavelength Division Multiplexed (WDM) Optical Communication System," incorporated herein by reference in its entirety.

The inventors have recognized that the Raman induced interference and CSO problems can be overcome in a simple approach by transmitting an odd number of optical channels in a manner which introduces destructive interference into the Raman induced impairments from the other channels. More particularly, the invention enables adjusting the phases of the separate channels with respect to one another. Specifically, Raman crosstalk and the induced CSO distortions can be reduced by alternating the phase of the signals by 180 degrees with respect to others of the signals.

The present inventors have also realized that the Raman induced interference and CSO problems could be overcome in a simple approach also by introducing destructive interference into the Raman induced impairments from the other channels. More particularly, the invention enables adjusting the phases of the separate channels with respect to one another. Specifically, Raman crosstalk and the induced CSO distortions can be reduced by alternating the phase of the signals by 180 degrees with respect to others of the signals. A discussion of reducing Raman crosstalk in this manner is provided in commonly assigned by the same inventors U.S. Ser. No. 11/697,071 titled "Method And Apparatus For Transmitting Multiple Channels In A Wavelength Division Multiplexed (WDM) Optical Communication System With Reduced Raman Crosstalk And Nonlinear Distortions."

The inventors have now further realized that additional reductions in Raman induced crosstalk and CSO distortions can be achieved by introducing an addition phase shift to some of the channels Specifically, Raman crosstalk and the induced CSO distortions can be further reduced by introducing some additional phase change to at least one of the existing signals whose phase was initially alternated with 180 degrees with respect to others of the signals. This approach further reduces the Raman induced interference and CSO distortions for WDM systems not only when an odd number of optical channels are employed, but also when an even number of optical channels are employed. The following guidelines and examples that are discussed in connection with wavelengths λ1-λ4 are presented by way of illustration only and should not be construed as a limitation on the invention.

Figure 5A:
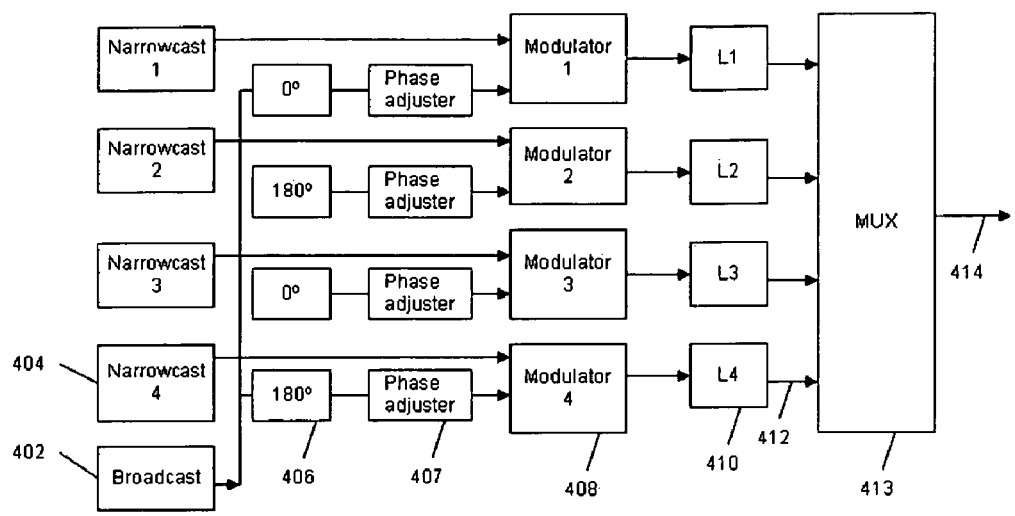
FIGS. 5A and 5B illustrate alternative examples of a WDM transmitter.

FIG. 5A illustrates an exemplary arrangement for a transmission system in accordance with the principles of the invention. While an even number of laser transmitters 410 is illustrated in FIG. 5A, it should be noted that an odd number of laser transmitters 410 may be employed as well. In this illustrative implementation, an RF broadcast signal is received at broadcast signal unit 402 and RF narrow cast signals are received at narrow cast signal units 404. Those of skill in the art will appreciate that broadcast signal unit 402 and narrowcast signal unit 404 are merely illustrated as separate units for discussion purposes and may take on any suitable form. The broadcast signal is split and provided to RF phase shifters or phase assignment units 406, which are associated with each respective channel, e.g. RF phase assignment units 406 provides a phase of 180 degrees or zero degrees to each broadcast signal. More particularly, the phase of 180 degrees may be provided to every other broadcast signal, e.g. to the odd numbered channels. In this manner, each of the adjacent channels preferably have a 180 degrees phase shift. Alternatively, the phase assignment may be provided to the even number of channels. In yet other implementations, the 180 degree phase assignment may be provided to an arbitrary subset of the channels so that least one channel is out of phase with respect to the remaining channels. Those of skill will appreciate that the phase assignment can be achieved through a variety other techniques, such as modulating external modulators, which are biased at different operational points, with the split in-phase broadcast signals, an amplification stage, an optical phase modulator, etc. In addition, the phase assignment provided to each broadcast signal may be achieved using multiple phase shifters or assignment units which each impart a portion of the total phase shift that is to be applied. If multiple phase assignment units are employed, they may be distributed at various points in the transmitter between the signal units 402 and 404 and the multiplexer 413. In some implementations the phase assignment unit or units may be arranged as a physically separate unit from the remaining components in the transmitter.

After undergoing a 0 degree or 180 degree phase assignment each of the RF broadcast signals is provided to a phase adjustor 407. In some implementations the phase adjustors 407 may be simply an RF or optical delay line of appropriate length. Alternatively, the phase adjustor may be a phase shifter or the like.

Each of the RF broadcast signals and an associated RF narrow cast signals are provided to one of the RF modulators 408. The modulators 408, in turn, drive lasers 410 to produce channels 1-4 at wavelengths λ1-λ4, respectively. In a preferred implementation, the lasers 410 are selected to transmit at sequential wavelengths in the ITU standard, e.g. 1270 nm, 1290 nm, 1310 nm, 1330 nm, 1350, etc., although of course the lasers 410 may transmit at other, non-ITU wavelengths as well. By using sequential wavelengths (e.g. sequential optical channels), the relative dispersion between the optical channels (e.g. between λ1-λ2) is at a minimum, and hence the destructive interference of the induced Raman gain is at a maximum by virtue of their respective 180 degree phase difference and the additional phase adjustment imparted by the phase adjustors 407. However, those of skill in the art will appreciate that non-sequential wavelengths may also be used so long as a sufficient amount of Raman induced impairment is removed. In one implementation, the wavelengths may also be at or near a zero dispersion wavelength of the transmission path. However, the wavelengths may also be located away from the zero dispersion wavelength of the transmission path.

The lasers 410 transmit through a corresponding optical fiber 412, respectively, to an optical multiplexer 413 which multiplexes λ1-λ4 onto optical fiber 414. In one implementation, optical multiplexer 413 is a phase balanced multiplexer and optical fibers 412 are made of appropriate respective lengths so that the relative optical phase between the adjacent channels is (e.g. remains) 180 degrees plus the additional phase adjustment imparted by the phase adjustors 407 when they are on optical fiber 414.

In a preferred implementation, the launch power (or amplitude) of the optical channels is substantially equal. However, an amplitude adjuster may be provided for adjusting the relative amplitudes of each laser (i.e. the optical signal output level generated by each of the lasers), or the optical modulation index of each laser. In addition, while FIG. 5a shows a modulator block separate from the laser block, those of skill in the art will appreciate that this arrangement is only for discussion purposes and that a directly modulated laser (DM) typically includes a modulation process internal to the laser which imposes the modulation on the formed optical wave emitted. Those of skill in the art will also appreciate that the techniques described herein can be applied to external modulators as well, in which the optical wave is typically modulated after being emitted form the laser.

Figure 5B:
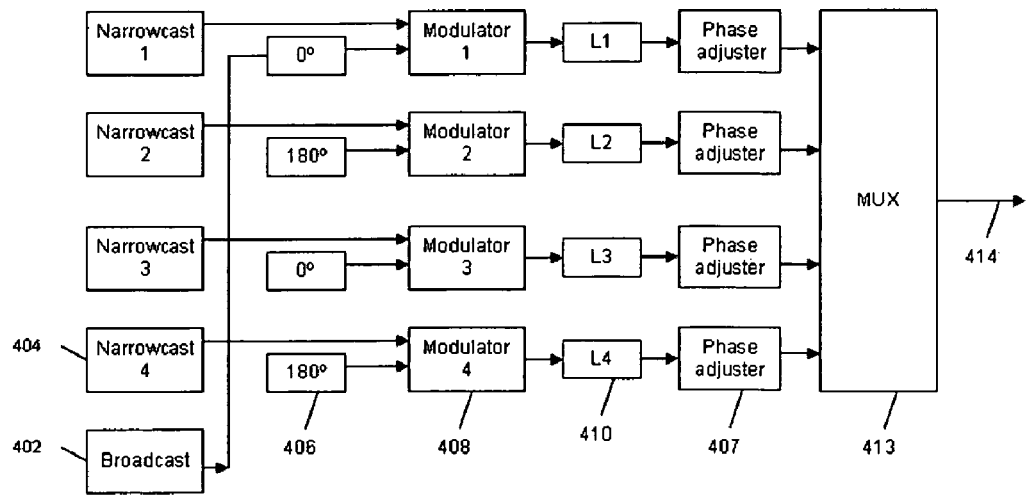

FIG. 5B shows one alternative example of the transmitter system shown in FIG. 5A. In FIGS. 5A and 5B, like elements are denoted by like reference numerals. In FIG. 5B the phase adjustors 407 are situated in the optical path between the modulators 408 and multiplexer 413. In this implementation the phase adjustor 407 may be an optical delay line (e.g., fiber) or any other suitable optical phase shifter. More generally, the overall phase adjustment can be achieved by a combination of electrical and optical phase shifting elements. As previously noted in connection with FIG. 5a, in general the phase adjusters may be situated at any point in the transmitter prior to the multiplexer 413 or distributed at multiple points within the transmitter prior to the multiplexer 413.

The following equations explain the process of eliminating the undesired Raman induced crosstalk and CSO distortions (collectively referred to as Raman induced impairments) utilizing the destructive interference. Under consideration here is the elimination of the deleterious Raman interaction effects upon the common broadcast information that is imparted on every optical signal in the system. The modulating information is represented by $f_i(t)$ and $f_j(t)$ in (2b). These modulation terms can be further decomposed into a common broadcast component and unique narrowcast components.

For explanation purposes, the signal wave power ($P_i$) of an optical wave in a system with multiple transmitters is given by the following equation, CSO is the composite second order; CTB is the composite triple beat; L is the length of fiber; G is the Raman gain coefficient; $L_{eff}$ is the effective length in the fiber at the pump wavelength, α is the power attenuation factor in the fiber at the signal wavelength, $\bar{\rho}_L$ is the running average probability of finding the two signals in the same state of polarization, $\tilde{n}_i$ and $\tilde{n}_j$ are the indices of refraction at the respective wavelengths, $G_{i,j}$ is the absolute Raman gain. Define the simple function $H_{i,j}$ as:

$$H_{i,j} \equiv \begin{cases} 1 & \lambda_i > \lambda_j \\ -1\dfrac{\tilde{n}_j \lambda_j}{\tilde{n}_i \lambda_i} & \lambda_i < \lambda_j \end{cases} \quad (2)$$

$$P_i(t,L) = P_{0i}\left(1 + L_{eff}\sum_{j=1}^{n} H_{i,j} G_{i,j} \bar{\rho}_{Li,j} P_{0j}\right) \quad (2a)$$

$$e^{-\alpha L} + \left[P_{0i} m_i f_i(t)\left(1 + L_{eff}\sum_{j=1}^{n} H_{i,j} G_{i,j} \bar{\rho}_{Li,j} P_{0j}\right) + \right.$$

$$\left. P_{0i} L_{eff}\sum_{j=1}^{n} H_{i,j} P_{0j} m_j f_j(t) G_{i,j} \bar{\rho}_{Li,j}\right]$$

$$e^{-\alpha L}\left[CSO_i\left(1 + L_{eff}\sum_{j=1}^{n} H_{i,j} G_{i,j} \bar{\rho}_{Li,j} P_{0j}\right) + \right.$$

$$P_{0i} L_{eff}\sum_{j=1}^{n} H_{i,j} G_{i,j} \bar{\rho}_{Li,j} CSO_j +$$

$$\left. P_{0i} m_i f_i(t) L_{eff}\sum_{j=1}^{n} H_{i,j} G_{i,j} \bar{\rho}_{Li,j} P_{0j} m_j f_j(t)\right]$$

$$e^{-\alpha L}\left[CTB_i\left(1 + L_{eff}\sum_{j=1}^{n} H_{i,j} G_{i,j} \bar{\rho}_{Li,j} P_{0j}\right) + \right.$$

$$P_{0i} L_{eff}\sum_{j=1}^{n} H_{i,j} G_{i,j} \bar{\rho}_{Li,j} CTB_j +$$

$$\left. P_{0i} m_i f_i(t)\dfrac{(L_{eff})^2}{2}\left[\sum_{j=1}^{n} H_{i,j} G_{i,j} \bar{\rho}_{Li,j} P_{0j} m_j f_j(t)\right]^2\right] e^{-\alpha L}$$

The summations in (2a) are over the parameters of the "n" transmitters in the system. It is important to note that the above equations are to be interpreted as being in the optical domain. Therefore the powers in these equations, including the distortions (CSOi, CSOj, CTBi, and CTBj) are optical powers and not electrical (or RF) power levels.

It is the specific purpose of this invention to eliminate through the use of destructive interference the deleterious effects of the Raman induced RF subcarrier crosstalk and CSO distortions. These are respectively represented by the second term in the second line of (2a) and the third term in the third line of (2a). That is, we seek solutions to the following equations along with the method and apparatus to physically realize the solutions:

$$0 = P_{0i}L_{eff}\sum_{j=1}^{n} H_{i,j}P_{0j}m_j f_j(t) G_{i,j}\bar{\rho}_{Li,j} \quad (2b)$$

$$0 = P_{0i}m_i f_i(t) L_{eff}\sum_{j=1}^{n} H_{i,j} G_{i,j}\bar{\rho}_{Li,j} P_{0j}m_j f_j(t)$$

$$f_i(t) = f_{BC}(t) + f_{NCi}(t)$$

$$f_j(t) = f_{BC}(t) + f_{NCj}(t) \quad (3a)$$

In (3a) $f_{BC}(t)$ represents the common broadcast information imparted upon all of the optical signals. Since the broadcast information is identical on all of the optical signals it does not depend upon the particular signal and hence has no indices associated with it. The broadcast information is highly correlated from one optical signal to any other. The broadcast information represents the coherent portion of the modulating information with respect to correlations from one optical signal to any other optical signal in the system.

The terms $f_{NCi}(t)$ and $f_{NCj}(t)$ represent unique narrowcast information modulating either the ith or jth optical transmitters respectively, in general these terms are not equal to one another and have no correlation to one another. The narrowcast information represents the incoherent portion of the modulating information with respect to correlations from one optical signal to any other optical signal in the system.

In the preferred implementation a phase shift $\theta_i$ can be imposed onto the composite broadcast modulation applied to the ith transmitter and a phase shift $\theta_i'$ can be imposed upon the composite narrowcast modulation applied to the ith transmitter. These phase shifts can be accomplished by means of a broadband phase shifter such as a transformer based all pass filter that has a constant phase shift across the modulation frequency band of interest. The composite modulation signals feeding each transmitter may be run though broadband phase shifters specifically tailored for each laser with a specified phase.

With such phase shifts applied (3a) becomes:

$$f_i(t,\theta_i,\theta_i') = f_{BC}(t,\theta_i) + f_{NCi}(t,\theta_i')$$

$$f_j(t,\theta_j,\theta_j') = f_{BC}(t,\theta_j) + f_{NCj}(t,\theta_j') \quad (3b)$$

Substituting (3b) into (2b):

$$0 = P_{0i}L_{eff}\left[\sum_{j=1}^{n} H_{i,j}P_{0j}m_j G_{i,j}\bar{\rho}_{Li,j} f_{BC}(t,\theta_j) + \sum_{j=1}^{n} H_{i,j}P_{0j}m_j G_{i,j}\bar{\rho}_{Li,j} f_{NCj}(t,\theta_j')\right] \quad (4)$$

$$0 = P_{0i}m_i[f_{BC}(t,\theta_i) + f_{NCi}(t,\theta_i')]L_{eff}\left[\sum_{j=1}^{n} H_{i,j}P_{0j}m_j G_{i,j}\bar{\rho}_{Li,j} f_{BC}(t,\theta_j) + \sum_{j=1}^{n} H_{i,j}P_{0j}m_j G_{i,j}\bar{\rho}_{Li,j} f_{NCj}(t,\theta_j')\right]$$

Dividing out the common terms in (4) and ignoring the phase difference between distortion beats for simplicity leaves:

$$0 = \quad (5a)$$

$$\sum_{j=1}^{n} H_{i,j}P_{0j}m_j G_{i,j}\bar{\rho}_{Li,j} f_{BC}(t,\theta_j) + \sum_{j=1}^{n} H_{i,j}P_{0j}m_j G_{i,j}\bar{\rho}_{Li,j} f_{NCj}(t,\theta_j')$$

$$0 = \sum_{j=1}^{n} H_{i,j}P_{0j}m_j G_{i,j}\bar{\rho}_{Li,j} f_{BC}(t,\theta_j) + \sum_{j=1}^{n} H_{i,j}P_{0j}m_j G_{i,j}\bar{\rho}_{Li,j} f_{NCj}(t,\theta_j')$$

Both lines of (5a) are identical meaning that the methodology employed to eliminate the Raman induced crosstalk will also eliminate the Raman induced CSO distortions. We need now only be concerned with one line in (5a):

$$0 = \sum_{j=1}^{n} H_{i,j}P_{0j}m_{BCj} G_{i,j}\bar{\rho}_{Li,j} f_{BC}(t,\theta_j) + \sum_{j=1}^{n} H_{i,j}P_{0j}m_{NCj} G_{i,j}\bar{\rho}_{Li,j} f_{NCj}(t,\theta_j') \quad (5b)$$

The first summation in (5b) represents the coherent broadcast components of the optical signals' modulations and the second summation represents the incoherent narrowcast components of the optical signal's modulations. Also in recognition of the fact that the broadcast and narrowcast optical modulation indices may be different, the OMI's in the two summations are now distinguished respectively as $m_{BCj}$ and $m_{NCj}$. Taking the Fourier transform of (5b) gives the frequency domain representation of the equation:

$$0 = F_{BC}(\omega)\sum_{j=1}^{n} H_{i,j}P_{0j}m_{BCj} G_{i,j}\bar{\rho}_{Li,j} e^{(i\theta_j)} + \sum_{j=1}^{n} H_{i,j}P_{0j}m_{NCj} G_{i,j}\bar{\rho}_{Li,j} F_{NCj}(\omega) e^{(i\theta_j')} \quad (6)$$

Where $F_{BC}(\omega)$ and $F_{NCi}(\omega)$ are the respective frequency domain representations of the broadcast and narrowcast modulating information. In all cases the frequency spectrum occupied by the broadcast modulation is different from and exclusive of the frequency spectrum occupied by the narrowcast modulation information therefore each summation in (6) can separately be set to zero giving:

$$0 = \sum_{j=1}^{n} H_{i,j} G_{i,j} \bar{\rho}_{Li,j} P_{0j} m_{BCj} e^{(i\theta_j)} \quad (7)$$

$$0 = \sum_{j=1}^{n} H_{i,j} G_{i,j} \bar{\rho}_{Li,j} F_{NCj}(\omega) P_{0j} m_{NCj} e^{(i\theta'_j)}$$

The first equation in (7) is the equation that describes the elimination of the Raman induced crosstalk and CSO on the coherent broadcast signals. The second equation relates to elimination of the Raman induced crosstalk and CSO on the incoherent narrowcast signal. However, those of skill in the art will appreciate that the incoherent narrowcast information is typically a digital format modulation such as quadrature amplitude modulation (QAM) which is more robust in the face of Raman induced crosstalk and CSO. Hence, as the narrowcast signals are already relatively resistant to degradation from Raman induced crosstalk and CSO, reducing the Raman induced crosstalk and CSO in the broadcast signals provides the most benefit. Therefore, in the remainder of this application the focus will be on explaining the conditions that eliminate the Raman induced distortions on the coherent broadcast modulation spectrum.

The coherent broadcast spectrum may consist of analog modulation (intensity modulation) and/or digital type modulation (QAM). The important quality is that the exact same broadcast modulation information is imparted upon every optical signal in the system.

Placing the criteria for eliminating the Raman induced crosstalk and CSO falling within the broadcast modulation spectrum in matrix form, we have, from the first line of equation 7:

$$0 = \begin{bmatrix} 0 & R_{12} & R_{13} & \cdots & R_{1n} \\ R_{2,1} & 0 & R_{23} & \cdots & R_{2n} \\ R_{3,1} & R_{3,2} & 0 & \cdots & R_{3n} \\ \vdots & \vdots & \vdots & \ddots & \vdots \\ R_{n,1} & R_{n,2} & R_{n,3} & \cdots & 0 \end{bmatrix}_{n \times n} \begin{bmatrix} e^{(i\theta_1)} m_{BC1} P_{01} \\ e^{(i\theta_2)} m_{BC2} P_{02} \\ e^{(i\theta_3)} m_{BC3} P_{03} \\ \vdots \\ e^{(i\theta_n)} m_{BCn} P_{0n} \end{bmatrix}_{1 \times n} \quad (8)$$

Suppose that the optical wavelengths are arranged such that $\lambda_1 < \lambda_2 \ldots < \lambda_{n-1} < \lambda_n$ then the matrix can be written as:

$$\begin{bmatrix} 0 \\ 0 \\ 0 \\ \vdots \\ 0 \end{bmatrix} = \begin{bmatrix} 0 & -\varepsilon_{1,2} r_{2,1} & -\varepsilon_{1,3} r_{3,1} & \cdots & -\varepsilon_{1,n} r_{n,1} \\ r_{2,1} & 0 & -\varepsilon_{2,3} r_{3,2} & \cdots & -\varepsilon_{2,n} r_{n,2} \\ r_{3,1} & r_{3,2} & 0 & \cdots & -\varepsilon_{3,n} r_{n,3} \\ \vdots & \vdots & \vdots & \ddots & \vdots \\ r_{n,1} & r_{n,2} & r_{n,3} & \cdots & 0 \end{bmatrix} \begin{bmatrix} e^{(i\theta_1)} m_{BC1} P_{01} \\ e^{(i\theta_2)} m_{BC2} P_{02} \\ e^{(i\theta_3)} m_{BC3} P_{03} \\ \vdots \\ e^{(i\theta_n)} m_{BCn} P_{0n} \end{bmatrix} \quad (9)$$

Where the Raman interaction matrix elements are written as $$r_{i,j} \equiv G_{i,j} \bar{\rho}_{Li,j} \text{ and } \varepsilon_{i,j} \equiv \frac{\tilde{n}_j \lambda_j}{\tilde{n}_i \lambda_i} \approx 1 \quad (10)$$

To understand the basic principle of operation of the Raman distortion destructive interference method consider the simplified case in which all of the launch powers are equal to one another, all of the broadcast OMI's are equal to one another, and the $\varepsilon_{i,j}$ factors are taken to be unity. With these simplifications (9) reduces to:

$$\begin{bmatrix} 0 \\ 0 \\ 0 \\ \vdots \\ 0 \end{bmatrix} = \begin{bmatrix} 0 & -r_{2,1} & -r_{3,1} & \cdots & -r_{n,1} \\ r_{2,1} & 0 & -r_{3,2} & \cdots & -r_{n,2} \\ r_{3,1} & r_{3,2} & 0 & \cdots & -r_{n,3} \\ \vdots & \vdots & \vdots & \ddots & \vdots \\ r_{n,1} & r_{n,2} & r_{n,3} & \cdots & 0 \end{bmatrix} \begin{bmatrix} e^{(i\theta_1)} \\ e^{(i\theta_2)} \\ e^{(i\theta_3)} \\ \vdots \\ e^{(i\theta_n)} \end{bmatrix} \quad (11)$$

We may further simplify (11) by making the ideal assumption, (which is only appropriate for illustrative purposes) that all of the $r_{i,j}$ have the same magnitude. With this great simplification (11) reduces to:

$$\begin{bmatrix} 0 \\ 0 \\ 0 \\ \vdots \\ 0 \end{bmatrix} = \begin{bmatrix} 0 & -1 & -1 & \cdots & -1 \\ 1 & 0 & -1 & \cdots & -1 \\ 1 & 1 & 0 & \cdots & -1 \\ \vdots & \vdots & \vdots & \ddots & \vdots \\ 1 & 1 & 1 & \cdots & 0 \end{bmatrix} \begin{bmatrix} e^{(i\theta_1)} \\ e^{(i\theta_2)} \\ e^{(i\theta_3)} \\ \vdots \\ e^{(i\theta_n)} \end{bmatrix} \quad (12)$$

Taking note of the following: the magnitudes of the complex phase exponentials are all unity, for a system with n optical signals there are n−1 nonzero elements in every row of the n×n Raman crosstalk interaction matrix. Therefore, in a system using these assumptions, by making n odd so that n−1 is even the contributions of every signal in every row of (12) can be cancelled out in pairs. We may also arrange the system so that the terms in the last row cancel out in pairs by assigning alternating phases as follows to the n (odd) wavelengths of the system:

$$\theta_1 = \theta_1, \theta_2 = \theta_1 + 180, \theta_3 = \theta_1 \ldots \theta_{n-1} = \theta_1 + 180, \theta_n = \theta_1 \quad (13a)$$

The preferred implementation, and perhaps the simplest scheme, is to let $\theta_1 = 0$ (assuming $\theta_1 = 0$ would not lose generality, although for most cases $\theta_1 \neq 0$ and $\theta_1$ may be a function of the modulation signal frequency) then the phases assigned to the n wavelengths alternate between 0 and 180 degrees ($\pi$ radians):

$$0_1, 180_2, 0_3, 180_4, 0_5, 180_6, \ldots, 0_n \quad (13b)$$

If the simplified system (12) is restricted to have an odd number of wavelengths, then each row of the n×n Raman crosstalk interaction matrix contains an even number of non-zero elements and if the phases are arranged as in (13b) every equation represented by (12) reduces to the summation of an alternating series of +1 and −1 which adds exactly to zero.

$$\begin{bmatrix} 0 \\ 0 \\ 0 \\ \vdots \\ 0 \end{bmatrix} = \begin{bmatrix} 0 & -1 & -1 & \cdots & -1 \\ 1 & 0 & -1 & \cdots & -1 \\ 1 & 1 & 0 & \cdots & -1 \\ \vdots & \vdots & \vdots & \ddots & \vdots \\ 1 & 1 & 1 & \cdots & 0 \end{bmatrix} \begin{bmatrix} 1 \\ -1 \\ 1 \\ \vdots \\ 1 \end{bmatrix}_{n\,ODD}$$

In a particular implementation of the invention, which may not be simply represented by equation (9) because of fiber dispersion, uneven Raman gain and fiber attenuation at various optical wavelengths, the ideal cancellation condition is more difficult to meet. The deviations from the ideal case become more pronounced as the channel wavelength spacing becomes larger. The various terms in the n×n Raman crosstalk interaction matrix may not be as simple as expressed in (2a). Equation (2a), (omitting the third order distortion terms), may need to be changed to $$P_i(t, L) \approx P_{0i}\left(1 + L_{eff}\sum_{j=1}^{n} H_{i,j}G_{i,j}\bar{\rho}_{Li,j}P_{0j}\right)e^{-\alpha L} +$$

$$abs\left\{P_{0i}m_i f_i(t)\left(1 + \sum_{j=1}^{n} L_{i,j}^{eff} H_{i,j}G_{i,j}\bar{\rho}_{Li,j}P_{0j}e^{j\theta_{i,j}}\right) + \right.$$

$$\left. P_{0i}\sum_{j=1}^{n} L_{i,j}^{eff} H_{i,j}G_{i,j}\bar{\rho}_{Li,j}P_{0j}m_j f_j(t)e^{j\theta_{i,j}}\right\}e^{-\alpha_i L} +$$

$$abs\left\{CSO_i\left(1 + \sum_{j=1}^{n} L_{i,j}^{eff} H_{i,j}G_{i,j}\bar{\rho}_{Li,j}P_{0j}e^{j\theta_{i,j}}\right) + \right.$$

$$P_{0i}\sum_{j=1}^{n} L_{i,j}^{eff} H_{i,j}G_{i,j}\bar{\rho}_{Li,j}P_{0j}CSO_j e^{j\theta_{i,j}} +$$

$$\left. P_{0i}m_i f_i(t)\sum_{j=1}^{n} L_{i,j}^{eff} H_{i,j}G_{i,j}\bar{\rho}_{Li,j}P_{0j}m_j f_j(t)e^{j\theta_{i,j}}\right\}e^{-\alpha_i L}$$

where $$L_{i,j}^{eff} = \frac{\sqrt{1 + e^{-2\alpha_j L} - 2e^{-\alpha_j L}\cos(\omega d_{ij}L)}}{\sqrt{\alpha_j^2 + (d_{ij}\omega)^2}}$$

is the effective length of the channel j referencing to channel i, $\omega$ is the RF frequency, $d_{ij}$ is the group velocity mismatch and $\theta_{i,j}$ is the phase caused by Raman crosstalk between the i and j channels. Again, if only Raman crosstalk and CSO are considered, Raman crosstalk and CSO can be written as $$XTALK_{RAMAN} = abs\left(P_{0i}\sum_{j=1}^{n} L_{i,j}^{eff} H_{i,j}G_{i,j}\bar{\rho}_{Li,j}P_{0j}m_j f_j(t)e^{j\theta_{i,j}}\right)e^{-\alpha_i L}$$

$$CSO_{RAMAN} = asb\left(P_{0i}m_i f_i(t)\sum_{j=1}^{n} L_{i,j}^{eff} H_{i,j}G_{i,j}\bar{\rho}_{Li,j}P_{0j}m_j f_j(t)e^{j\theta_{i,j}}\right)e^{-\alpha_i L}$$

As indicated in the above two equations, the gain, fiber attenuation, Raman crosstalk phase, and the effective length are all dependent on the channel wavelength assignment. Unlike the ideal case, the conditions necessary to cancel the total crosstalk and CSO distortion may be hard to achieve. This may be true even for an odd number of optical channels. However, when the channel spacing become smaller, the ideal condition necessary to achieve cancellation is approached. In other words, total crosstalk and CSO distortion cancellation is easier to achieve for a system with closely spaced channels, but more difficult to achieve for a system with widely spaced channels.

For a system with an even number of optical channels, the total cancellation in Raman crosstalk and CSO distortion may not be possible even if fiber dispersion effects are ignored and the Raman gain and fiber attenuation are assumed to be equal across the wavelengths.

For a non ideal system, where the channel spacing is wide or the number of channels is even, we may, balance the overall inequities in each equation representing the interacting Raman components by adjusting the launch power levels, OMI values, phase settings and channel wavelength assignment for each optical signal in the system so that every equation results in a minimum net sum. Hence, the Raman induced crosstalk and CSO distortions in the broadcast modulation spectra is nevertheless minimized, if not totally eliminated, on every wavelength in the system. Accordingly, the design goal is to find solutions to min($XTALK_{RAMAN}$) and min($CSO_{RAMAN}$). If we keep the optical launch power and the signal OMI the same for all the optical channels, we may adjust the phase of at least one optical channel to achieve the design goal. The design goal with the adjusted phase can be described as $$XTALK_{RAMAN} = $$
$$min\left[abs\left(P_{0i}\sum_{j=1}^{n} L_{i,j}^{eff} H_{i,j}G_{i,j}\bar{\rho}_{Li,j}P_{0j}m_j f_j(t)e^{j\theta_{i,j}}e^{j\Theta_j}\right)e^{-\alpha_i L}\right]$$

$$CSO_{RAMAN} = $$
$$min\left[asb\left(P_{0i}m_i f_i(t)\sum_{j=1}^{n} L_{i,j}^{eff} H_{i,j}G_{i,j}\bar{\rho}_{Li,j}P_{0j}m_j f_j(t)e^{j\theta_{i,j}}e^{j\Theta_j}\right)e^{-\alpha_i L}\right]$$

where $\Theta_j$ is the phase term added to the channel j, which may be a constant or a function of $\omega$.

FIGS. 6A-6D shows an illustrative example based on a three wavelength system in which all of the launch powers are equal to one another and all of the broadcast OMI's are equal to one another. Furthermore, the phase relationship of (13b) is applied to the system. That is, as shown in FIG. 6A, one wavelength is 180 degrees out of phase with respect to the other two wavelengths. In this system the Raman gain is not a constant because the gain is larger for larger wavelength/channel spacings, which, as previously discussed, is an inherent result of the Raman gain process. Suppose wavelengths in the system follows $\lambda_1<\lambda_2<\lambda_3$, we have $G_{12}=-G_{32}<G_{13}$ or $-G_{21}=G_{23}<-G_{31}$ The signals S1, S2 and S3, are of equal magnitude but S1 and S3 have a phase of 0 degrees. The signal S2 is selected to be 180 degrees out of phase with respect to the first two signals. The signals are represented, for simplicity, by vectors along the real axis on the complex plane Argand diagram. FIG. 6A shows the relative (phase) orientation of the signals with respect to one another without any additional phase adjustments. FIG. 6B diagrammatically illustrates how the signals interact with one another through the Raman process, also before introducing any additional phase adjustments to signals S1 and S3. FIG. 6C shows the relative (phase) orientation when an additional phase adjustment is imparted above and beyond the previously established phase relationship illustrated in FIG. 6A. FIG. 6D diagrammatically illustrates how the signals interact with one another through the Raman process after introducing the additional phase to signals S1 and S3. It is seen that with the added phase adjustment the residual Raman crosstalk changes so that it is 90 degrees out of phase from the original signal(s). The degradation is therefore reduced by a power summation instead of by amplitude summation. This simple example is presented for illustrative purposes only. The actual interaction between Raman crosstalk and CSO beats due to phase shifting and phase adjustments can be much more complex.

In every case the Raman impairments can be either eliminated or substantially reduced from the common (coherent) broadcast modulation being transmitted on every wavelength in the system by ensuring that adjacent signals are out of phase with one another and then imparting some additional phase adjustment as described above. We can, of course, achieve further reductions in the Raman impairment by adjusting the optical channel launch power, optical modulation index, the light polarization etc. It should also be noted that the technique as explained above can be used in both CWDM and DWDM systems and therefore may be used more generally in any WDM system.

For DWDM systems, it is generally easier to achieve the ideal cancellation conditions when there are an odd number of wavelengths. It should also be noted that in the example of FIG. 6, had four or six total optical signals been used instead of three wavelengths then, in turn, either three or five wavelengths would have been interacting with one another by means of the Raman process to create impairments on the fourth or sixth wavelengths in each row of the corresponding matrix equations. The techniques described herein further reduce the Raman impairment above and beyond the reduction that can be achieved simply by ensuring that adjacent signals are out of phase with one another. Accordingly, the techniques described herein can be used to reduce Raman impairments when there are an even number of optical wavelengths. In addition, these techniques can also provide further reductions in the Raman impairment of a system when there are an odd number of wavelengths even without the use of other optical parameter adjustment techniques, such as polarization alignment, OMI adjustment, and power adjustment. However, those of skill in the art will appreciate that in certain implementations the removal of Raman induced impairments may be further optimized by performing one or more of the other optical parameter adjustment techniques as well.

As previously mentioned, Raman induced impairments can be particularly acute when the channels are located at wavelengths near the zero dispersion wavelength of the transmission medium because the optical channels largely maintain their relative phases at these wavelengths. For the same reason, the aforementioned technique in which some of the channels are arranged to be out of phase with respect to other channels will be most effective when the channels are located near the zero dispersion wavelength of the transmission path. For instance, for channels operating in the 1310 nm window (typically defined as the waveband between about 1270 nm and 1370 nm), a commonly employed single mode optical fiber is the SMF-28™ fiber, available from Corning, Incorporated. The SMF-28 fiber has a zero dispersion wavelength at or near 1310 nm. Accordingly, if this transmission fiber is employed, Raman crosstalk can be most effectively reduced for optical channels having wavelengths in the vicinity of 1310 nm. Similarly, for optical wavelengths operating in the C-band (wavelengths between about 1525 to 1565 nm), a commonly available optical fiber is Corning's Leaf™ fiber, which has a zero dispersion wavelength near 1500 nm. For the Leaf™ fiber, the Raman crosstalk can be more effectively reduced for channels having wavelengths in the vicinity of 1500 nm than for channels in the vicinity of 1525 nm or 1565 nm. If, on the other hand, the optical wavelengths operate in the L-band (wavelengths between about 1565 to 1625 nm), a commonly available optical fiber is Corning's Leaf.R™ fiber, which has a zero dispersion wavelength near 1590 nm. For the Leaf.R™ fiber, the Raman crosstalk can be more effectively reduced for channels having wavelengths in the vicinity of 1590 nm than for channels in the vicinity of 1565 nm or 1625 nm. In the case where optical wavelengths in a WDM system are remote from the zero dispersion wavelength, closer wavelength spacing between WDM channels may be required or link length may be limited (or limited to a short span of a long fiber) in order to maintain the relative phase between channels and therefore the effectiveness of this technique.

Figure 7:
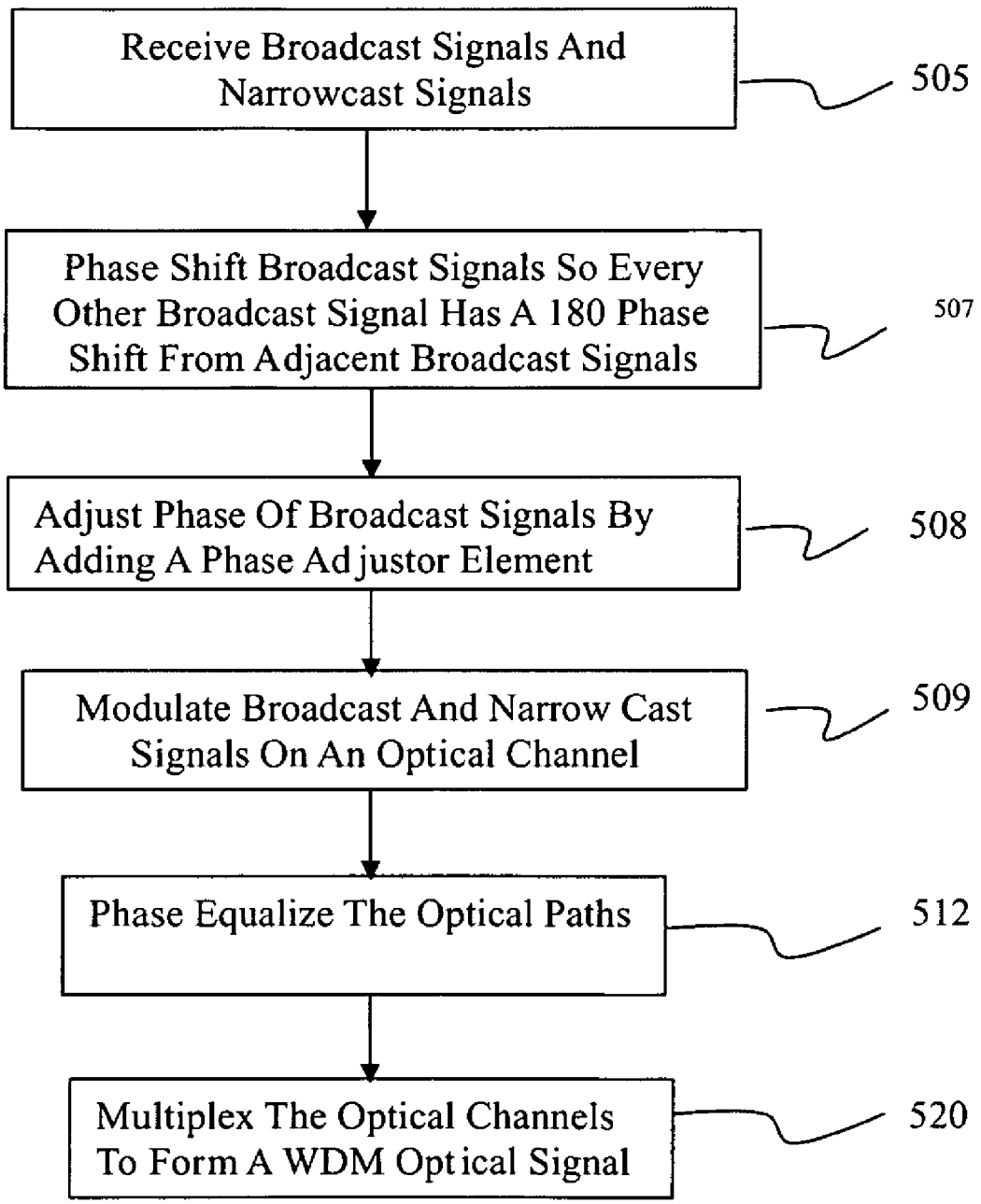
FIG. 7 is a flowchart showing one example of the method performed by the transmitter arrangement depicted in FIG. 5.

FIG. 7 is a flowchart showing just one example of the method performed by the transmitter arrangement depicted in FIG. 5. The method begins in step 505 by receiving multiple information-bearing electrical signals that all embody the same broadcast information. The electrical signals may, for example, embody audio and/or video broadcast programming, and may be analog or digital modulation formats, hereafter collectively referred to as "broadcast signals". Next, in step 507, the broadcast signals are phase shifted so that every other broadcast signal has a 180 degree phase shift from its adjacent broadcast signals, e.g. each odd broadcast signal is phase shifted by 180 degrees (As previously noted, more generally, any arbitrary subset of the broadcast signals may be phase shifted with respect to the remaining channels. Additionally this methodology is applicable to either the entire broadcast band or any selected subsets of the broadcast band). Then, the phase shifted broadcast signals are further phase adjusted in step 508. The broadcast signals, along with narrowcast signals, are modulated onto an optical channel, in step 509. Those of skill in the art will appreciate that the signals may be modulated on the optical channel by a direct modulation technique in which the laser source is modulated to impose the signals on the laser internally. Alternatively, an external modulation technique may be used in which the laser is modulated external to the laser source, i.e. after the optical channel is produced by the laser source. In either form of modulation, the phase of the optical channels are preferably further controlled in step 512 to ensure that the optical channels retain their respective phase shifts assigned in steps 507 and 508 so that the intended phase assignment of each wavelength is maintained when they are combined on the same optical fiber. Also in the preferred implementation, the wavelengths of the optical channels are sequential wavelengths in the ITU grid or in some other specified wavelength arrangement, such as from shortest to longest wavelengths. The optical channels are multiplexed on the same fiber in step 520, preferably using a phase balanced multiplexer, to form a WDM optical signal. Those of skill in the art will appreciate that the system may use any suitable multiplexing technique including CWDM and DWDM.

In addition to reducing crosstalk that arises from Raman interactions, the methods and techniques described herein can also mitigate and even eliminate the affects of distortion that arise from Raman interactions, particularly second order distortion, which is known to be especially serious for analog signals. While analog channels are most vulnerable to such distortion, digital channels are also impacted and thus the methods and techniques described herein can reduce Raman distortion arising in both analog and digital signals.

The transmitter arrangement described above can be advantageously used in any optical network in which a broadcast signal is multiplexed onto multiple optical wavelengths or channels. Such networks include, without limitation, various all-optical networks, hybrid fiber-coax (HFC) networks and networks utilizing a passive architecture, which are often referred to as Passive Optical Networks (PONs). In typical HFC architectures, the broadcast signal is split at optical hubs and then sent to different nodes together with narrowcast signals.

A method and apparatus have been described for reducing the Raman induced crosstalk and distortion impairments that arise within the individual channels of a WDM optical communication system. These Raman induced impairments are particularly severe among channels that are located near the zero dispersion wavelength of the transmission medium or among closely spaced optical channels in which the dispersion differences amongst the optical channels are relatively small. The method and apparatus are particularly suitable when the individual channels support broadcast signals carrying the same information, which are sometimes transmitted over a transmission network such as an HFC or PON network.

The invention claimed is:

1. A method of transmitting a WDM optical signal comprising the steps of:
   modulating a plurality of optical channels that are each located at a different wavelength from one another with a respective one of a plurality of information-bearing broadcast signals that all embody the same broadcast information, at least one of the broadcast signals being out of phase with respect to remaining ones of the plurality of broadcast signals;
   applying a phase adjustment to one or more of the broadcast signals or one or more of the optical channels;
   multiplexing each of the optical channels to form a WDM optical signal; and
   forwarding the WDM optical signal onto an optical transmission path.

2. The method of claim 1, wherein the modulating further comprises applying a phase shift of 180 degrees to said at least one of the plurality of broadcast signals relative to the remaining ones of the plurality of broadcast signals.

3. The method of claim 1, wherein the plurality of optical channels is an even or odd number of optical channels.

4. The method of claim 1, wherein the modulating further comprises applying a phase shift of 180 degrees to selected ones of the plurality of broadcast signals so that the optical channels modulated thereby have contributions to Raman induced impairments at a selected one of the optical channels that are diminished by contributions to Raman induced impairments from optical channels that do not undergo a phase shift.

5. The method of claim 1, wherein the phase adjustment further comprises applying a phase adjustment to selected ones of the plurality of broadcast signals so that the optical channels modulated thereby have contributions to Raman induced impairments at a selected one of the optical channels that are diminished by contributions to Raman induced impairments from remaining ones of the optical channels.

6. The method of claim 1, wherein the phase adjustment further comprises applying an electrical phase adjustment to the one or more broadcast signals.

7. The method of claim 1, wherein the phase adjustment further comprises applying an optical phase adjustment to the one or more optical channels.

8. The method of claim 1, wherein the step of modulating a plurality of optical channels further includes combining a narrowcast signal with each broadcast signal prior to modulating.

9. The method of claim 1, wherein the Raman induced impairments are reduced without use of other optical parameter adjustment techniques.

10. The method of claim 1, wherein the modulating further comprises:
    phase shifting of at least one of the plurality of broadcast signals that all embody the same information, wherein the phase shifted broadcast signal(s) and remaining ones of the signals modulate optical channels at different optical wavelengths, respectively, such that Raman crosstalk and distortions are reduced at an optical channel that is at a predetermined optical wavelength; and
    wherein the phase adjusting further comprises phase adjusting at least one of the plurality of broadcast signals, wherein the phase shifted broadcast signal(s) and the phase adjusted signals modulate optical channels at different optical wavelengths, respectively, such that Raman crosstalk and distortions are further reduced at the predetermined optical wavelength.

11. The method of claim 10 wherein the phase-shifted broadcast signal and the phase adjusted broadcast signal are different broadcast signals.

12. The method of claim 10 wherein the phase-shifted broadcast signal and the phase adjusted broadcast signal are the same broadcast signal.

13. The method of claim 10, wherein the step of modulating a plurality of optical channels includes externally modulating a laser transmitter with the broadcast signals and narrowcast signals.

14. The method of claim 1, wherein the wavelengths are sequential wavelengths.

15. The method of claim 1, wherein the wavelengths are non-sequential wavelengths.

16. The method of claim 1, further comprising equalizing optical and/or electrical paths traversed by information signals that modulate the optical channels so that the phase adjustment is maintained on the optical transmission path.

17. The method of claim 1, further comprising maintaining a phase relationship among the modulated optical channels when the modulated optical channels are forwarded onto the optical transmission path.

18. The method of claim 1, wherein the step of modulating a plurality of optical channels includes directly modulating a laser transmitter with the broadcast signals and narrowcast signals.

19. The method of claim 1, wherein the optical channels are located at wavelengths at or near a zero dispersion wavelength of the transmission path.

20. The method of claim 19, where the optical channels are CWDM or DWDM signals.

21. The method of claim 1, where the optical channels are closely spaced at nonzero dispersion wavelengths of the transmission path.

22. The method of claim 1, where the optical channels are widely spaced at nonzero dispersion wavelengths of the transmission path.

23. A WDM optical transmitter comprising:
    a plurality of optical sources for generating optical channels located at different wavelengths;
    a plurality of modulators each having an input for receiving a respective one of a plurality of information-bearing broadcast signals that all embody the same broadcast information, each modulator being associated with a respective one of the plurality of optical sources to thereby provide a plurality of modulated optical channels;
    at least one phase shifter for establishing an out-of-phase relationship between at least one of the plurality of broadcast signals and remaining ones of the plurality of broadcast signals such that Raman impairments are reduced;
    a phase adjustor for causing adjustment of a phase of at least one of the plurality of modulated optical channels so that Raman impairments are further reduced; and
    a multiplexer coupled to the plurality of optical sources to receive and combine the modulated optical channels to produce a multiplexed optical signal.

24. The WDM optical transmitter of claim 23 wherein the phase adjuster is an electrical phase adjuster for adjusting a phase of at least one of the plurality of broadcast signals.

25. The WDM optical transmitter of claim 23 wherein the phase adjuster is an optical phase adjuster for adjusting a phase of at least one of the plurality of modulated optical channels.

26. The WDM optical transmitter of claim 23, wherein the phase shifter is configured to apply a phase shift of 180 degrees to said at least one of the plurality of broadcast signals relative to the remaining ones of the plurality of broadcast signals.

27. The WDM optical transmitter of claim 23, wherein the Raman induced impairments are reduced without use of other optical parameter adjustment techniques.

28. The WDM optical transmitter of claim 23, wherein the phase shifter is configured to shift a phase of a first broadcast signal with respect to a second broadcast signal, wherein the first and second broadcast signals modulate optical channels at first and second optical wavelengths, respectively, such that Raman induced crosstalk and induced distortions are reduced at a third optical channel.

29. The WDM optical transmitter of claim 23, wherein the optical channels are located at wavelengths at or near a zero dispersion wavelength of an optical transmission path into which the optical signal is to be transmitted.

30. The WDM optical transmitter of claim 23, wherein the plurality of optical modulators are configured to receive narrowcast signals which are combined with each broadcast signal prior to modulating.

31. The WDM optical transmitter of claim 23, further including a phase controlling element which equalizes the paths of the modulated optical channels so that a pre-assigned phase relationship between optical channels is maintained at an output of the multiplexer.

32. The WDM optical transmitter of claim 23, wherein the plurality of modulators include modulators which directly or externally modulate a laser transmitter with the broadcast signals and narrowcast signals on an optical channel.

33. The WDM optical transmitter of claim 23, wherein the optical channels are located at wavelengths at or near a zero dispersion wavelength of the transmission path.

34. The WDM optical transmitter of claim 23, where the optical channels are located at nonzero dispersion wavelengths of the transmission path.

35. The WDM optical transmitter of claim 23, where the optical channels are at nonzero dispersion wavelengths of the transmission path.

* * * * *